US012210297B2

(12) United States Patent
Fukumoto

(10) Patent No.: US 12,210,297 B2
(45) Date of Patent: Jan. 28, 2025

(54) IMAGE FORMING APPARATUS

(71) Applicant: CANON KABUSHIKI KAISHA, Tokyo (JP)

(72) Inventor: Ryota Fukumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/295,029

(22) Filed: Apr. 3, 2023

(65) Prior Publication Data

US 2023/0236522 A1 Jul. 27, 2023

Related U.S. Application Data

(63) Continuation of application No. 17/740,170, filed on May 9, 2022, now Pat. No. 11,644,764.

(30) Foreign Application Priority Data

May 28, 2021 (JP) ................................ 2021-089703

(51) Int. Cl.
*G03G 15/041* (2006.01)
*G03G 15/04* (2006.01)
*G03G 21/16* (2006.01)

(52) U.S. Cl.
CPC ... *G03G 15/04054* (2013.01); *G03G 21/1652* (2013.01)

(58) Field of Classification Search
CPC ..................... G03G 15/04054; G03G 21/1652
USPC .......................................... 399/119, 177, 220
See application file for complete search history.

(56) References Cited

U.S. PATENT DOCUMENTS

| | | | | |
|---|---|---|---|---|
| 8,400,481 B2 * | 3/2013 | Sakai | G03G 15/326 399/116 |
| 11,347,158 B2 * | 5/2022 | Fukumoto | G03G 15/04036 |
| 11,644,764 B2 * | 5/2023 | Fukumoto | G03G 15/04054 399/220 |
| 2015/0346629 A1 * | 12/2015 | Nagamine | G03G 21/1666 29/428 |

(Continued)

FOREIGN PATENT DOCUMENTS

| | | |
|---|---|---|
| JP | 2009119805 A | 6/2009 |
| JP | 2016175237 A | 10/2016 |

(Continued)

*Primary Examiner* — Hoan H Tran
(74) *Attorney, Agent, or Firm* — Canon U.S.A., Inc., IP Division

(57) ABSTRACT

An image forming apparatus includes a photosensitive member that is rotatable, a substrate, a lens array, a holder, and a conductive member provided on the holder. The substrate includes a plurality of light-emitting elements, a driver integrated circuit (IC), and a wiring pattern. The plurality of light-emitting elements is arrayed in a rotational axis direction of the photosensitive member to emit light to which a surface of the photosensitive member is exposed. The driver IC drives the plurality of light-emitting elements. The wiring pattern includes a supply line that supplies power to the driver IC and a ground wire that grounds the driver IC. The lens array collects the light emitted from the plurality of light-emitting elements on the photosensitive member. The holder holds the substrate and the lens array, is grounded, and is made of metal. The conductive member electrically connects the holder and the ground wire.

20 Claims, 13 Drawing Sheets

(56) References Cited

U.S. PATENT DOCUMENTS

2017/0219952 A1* 8/2017 Furuta ................. H01L 25/0753

FOREIGN PATENT DOCUMENTS

| | | | |
|---|---|---|---|
| JP | 2019217739 | * | 12/2019 |
| JP | 2020003595 | A | 1/2020 |

* cited by examiner

IMAGE FORMING APPARATUS

CROSS REFERENCE TO RELATED APPLICATIONS

The present application is a continuation of U.S. patent application Ser. No. 17/740,170, filed on May 9, 2022, which claims the benefit of Japanese Patent Application No. 2021-089703, filed May 28, 2021, all of which are hereby incorporated by reference herein in their entireties.

BACKGROUND

Field

The present disclosure relates to an image forming apparatus including an exposure head.

Description of the Related Art

There is an image forming apparatus, such as a printer or a copying machine, that uses an exposure head including a plurality of light-emitting elements for exposing the surface of a photosensitive member to light. The exposure head may use light-emitting diodes (LEDs), organic electro-luminescence (EL) devices, or the like as the light-emitting elements. United States Patent Application Publication No. 2015/346628 discusses an exposure head that includes a holder that is made of resin and holds a substrate on which light-emitting elements are arranged and a lens array for collecting light emitted from the light-emitting elements on a photosensitive member.

To achieve a further increase in image quality of the image forming apparatus, it is desirable to reduce the intensity of noise emitted from a wiring pattern formed on the substrate. To achieve this, it is effective to ground a ground wire for the wiring pattern formed on the substrate. However, since the substrate is held by the holder made of resin, the ground wire formed on the substrate cannot be grounded via the holder.

SUMMARY

Accordingly, the present disclosure is directed to providing a configuration for grounding a ground wire for a wiring pattern formed on a substrate with a simple configuration.

According to an aspect of the present disclosure, an image forming apparatus includes a photosensitive member that is rotatable, a substrate including a plurality of light-emitting elements arrayed in a rotational axis direction of the photosensitive member and configured to emit light to which a surface of the photosensitive member is exposed, a driver integrated circuit (IC) configured to drive the plurality of light-emitting elements, and a wiring pattern including a supply line configured to supply power to the driver IC and a ground wire configured to ground the driver IC, a lens array configured to collect the light emitted from the plurality of light-emitting elements on the photosensitive member, a holder configured to hold the substrate and the lens array, wherein the holder is grounded and made of metal, and a conductive member provided on the holder and configured to electrically connect the holder and the ground wire.

Further features of the present disclosure will become apparent from the following description of exemplary embodiments with reference to the attached drawings.

BRIEF DESCRIPTION OF THE DRAWINGS

FIGS. 4A, 4B1, 4B2, 4C1, and 4C2 each illustrate a configuration of a substrate and a lens array.

DESCRIPTION OF THE EMBODIMENTS

Exemplary embodiments for carrying out the present disclosure will be described below with reference to the drawings. The scope of the disclosure is not limited only to the dimensions, materials, shapes, relative arrangements, and the like of components described in the following exemplary embodiments, unless otherwise specified.

(Image Forming Apparatus)

Figure 1A:
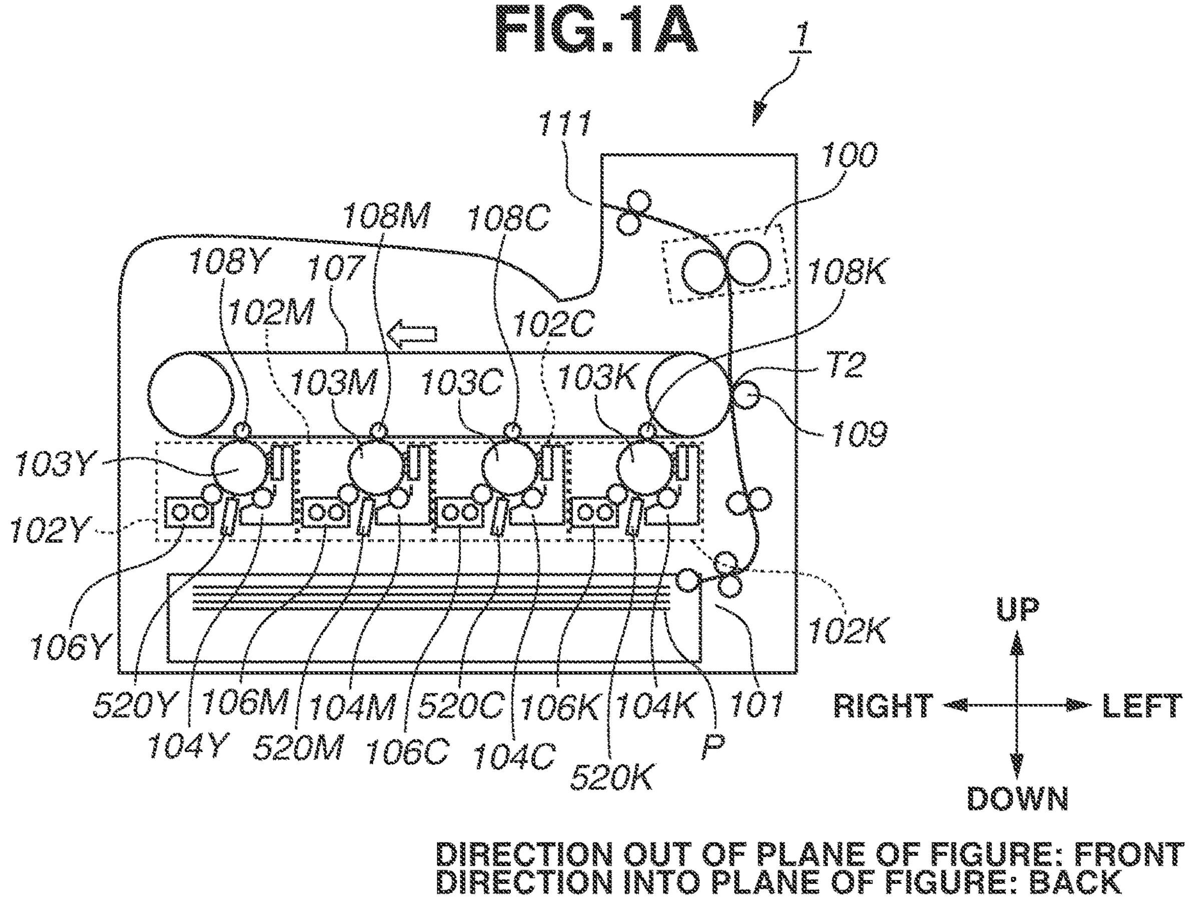
FIGS. 1A and 1B are schematic sectional views each illustrating an image forming apparatus.

A schematic configuration of an image forming apparatus 1 will now be described. FIG. 1A is a schematic sectional view of the image forming apparatus 1. The image forming apparatus 1 illustrated in FIG. 1A is a color printer (single function printer (SFP)) including no scanning device, but instead may be a copying machine including a scanning device. In exemplary embodiments of the present disclosure, not only a color image forming apparatus including a plurality of photosensitive drums 103 as illustrated in FIG. 1A, but also a color image forming apparatus including a single photosensitive drum 103, or an image forming apparatus that forms a monochrome image may be used.

The image forming apparatus 1 illustrated in FIG. 1A includes four image forming units 102Y, 102M, 102C, and 102K (hereinafter collectively referred to simply as an image forming unit 102). The image forming units 102Y, 102M, 102C, and 102K form toner images of yellow, magenta, cyan, and black, respectively. The image forming units 102Y, 102M, 102C, and 102K include photosensitive drums 103Y, 103M, 103C, and 103K (hereinafter collectively referred to simply as a photosensitive drum 103), respectively. The image forming units 102Y, 102M, 102C, and 102K also include chargers 104Y, 104M, 104C, and 104K (hereinafter collectively referred to simply as a charger 104) that charge the photosensitive drums 103Y, 103M, 103C, and 103K, respectively. The image forming units 102Y, 102M, 102C, and 102K also include light-emitting diode (LED) exposure units 520Y, 520M, 520C, and 520K (hereinafter collectively referred to simply as an exposure unit 520), respectively. The LED exposure units 520Y, 520M, 520C, and 520K are exposure light sources that emit light to expose surfaces of the photosensitive drums 103Y, 103M, 103C, and 103K, respectively. The image forming units 102Y, 102M, 102C, and 102K also include developing units 106Y, 106M, 106C, and 106K (hereinafter collectively referred to simply as a developing device 106), respectively. The developing device 106 is a developing unit that develops, with toner, an electrostatic latent image formed on the photosensitive drum 103 into a toner image, so that toner images of respective colors is developed on the respective photosensitive drums 103. Characters Y, M, C, and K added to each reference numeral represent yellow, magenta, cyan, and black colors of toner, respectively.

Figure 1B:
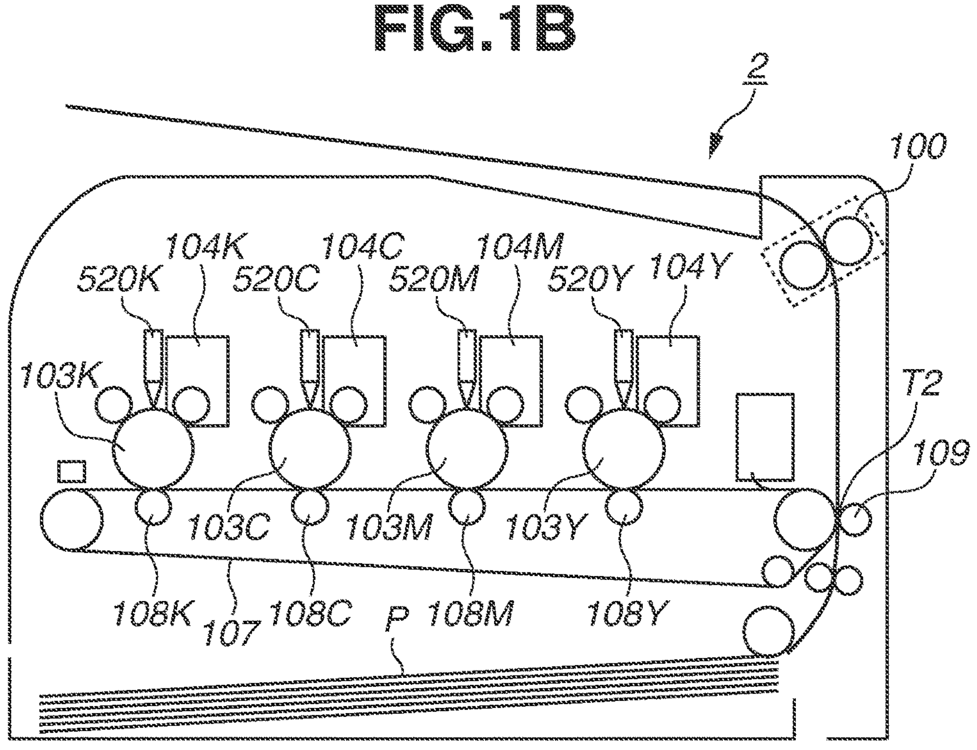

The image forming apparatus 1 illustrated in FIG. 1A is an image forming apparatus that adopts what is called a lower surface exposure method for exposing the surface of the photosensitive drum 103 to light from below. The following description is provided on the premise that the image forming apparatus 1 adopts the lower surface exposure method. However, the image forming apparatus 1 may adopt an upper surface exposure method for exposing the surface of the photosensitive drum 103 to light from above, as with an image forming apparatus 2 illustrated in FIG. 1B. In FIG. 1B, portions that represent the same components as those in FIG. 1A are denoted by the same reference symbols.

The image forming apparatus 1 also includes an intermediate transfer belt 107 and primary transfer rollers 108 (108Y, 108M, 108C, and 108K). Toner images formed on the photosensitive drums 103 are transferred to the intermediate transfer belt 107. The primary transfer rollers 108 (108Y, 108M, 108C, and 108K) sequentially transfer the toner images formed on the photosensitive drums 103 to the intermediate transfer belt 107. The image forming apparatus 1 also includes a secondary transfer roller 109 and a fixing unit 100. The secondary transfer roller 109 is a transfer unit that transfers the toner images formed on the intermediate transfer belt 107 to recording paper P that is conveyed from a sheet feeding unit 101. The fixing unit 100 fixes the secondarily transferred images to the recording paper P.

(Image Forming Process)

The exposure unit 520Y exposes the surface of the photosensitive drum 103Y, which has been charged by the charger 104Y, to light. As a result, an electrostatic latent image is formed on the surface of the photosensitive drum 103Y. Next, the developing device 106Y develops the electrostatic latent image formed on the surface of the photosensitive drum 103Y with yellow toner. The yellow toner image developed on the surface of the photosensitive drum 103Y is transferred to the intermediate transfer belt 107 by the primary transfer roller 108Y. Magenta, cyan, and black toner images are transferred to the intermediate transfer belt 107 through a similar image forming process.

The toner images of the respective colors transferred to the intermediate transfer belt 107 are conveyed to a secondary transfer portion T2 by the intermediate transfer belt 107. A transfer bias for transferring the toner images to the recording paper P is applied to the secondary transfer roller 109 disposed on the secondary transfer portion T2. The toner images conveyed to the secondary transfer portion T2 are transferred to the recording paper P which has been conveyed from the sheet feeding unit 101 by the transfer bias of the secondary transfer roller 109. The recording paper P to which the toner images are transferred is conveyed to the fixing unit 100. The fixing unit 100 fixes the toner images to the recording paper P with heat and pressure. The recording paper P on which the fixation process has been performed by the fixing unit 100 is discharged to a sheet discharge portion 111.

(Drum Units and Developing Units)

Drum units 518Y, 518M, 518C, and 518K (hereinafter collectively referred to simply as a drum unit 518) including the photosensitive drums 103 are attached to the image forming apparatus 1. In the present exemplary embodiment, the drum unit 518 is also referred to as a photosensitive member unit. The drum unit 518 is a cartridge that is replaced by an operator, such as a user or maintenance engineer. The drum unit 518 rotatably supports the photosensitive drum 103. In this case, the drum unit 518 also functions as a drum support member that rotatably supports the photosensitive drum 103. In the present exemplary embodiment, a drum unit including the drum support member is referred to as the drum unit 518. Specifically, the photosensitive drum 103 is rotatably supported by a frame member of the drum unit 518. The drum unit 518 need not necessarily include the charger 104 and a cleaning device.

Developing units 641Y, 641M, 641C, and 641K (hereinafter collectively referred to simply as a developing unit 641), which are provided separately from the drum units 518, are attached to the image forming apparatus 1 according to the present exemplary embodiment. The developing unit 641 according to the present exemplary embodiment is a cartridge having a configuration in which the developing device 106 illustrated in FIG. 1A and a toner storage portion are integrated. The developing device 106 includes a developing sleeve (not illustrated) that carries developer. The developing unit 641 is provided with a plurality of gears for rotating a screw to mix toner and carrier. For example, when the gears have degraded with time, the operator detaches the developing unit 641 from an apparatus body of the image forming apparatus 1 and replaces the developing unit 641. The drum unit 518 and the developing unit 641 according to the present exemplary embodiment may be a process cartridge having a configuration in which the drum unit 518 and the developing unit 641 described above are integrated.

Figure 2A:
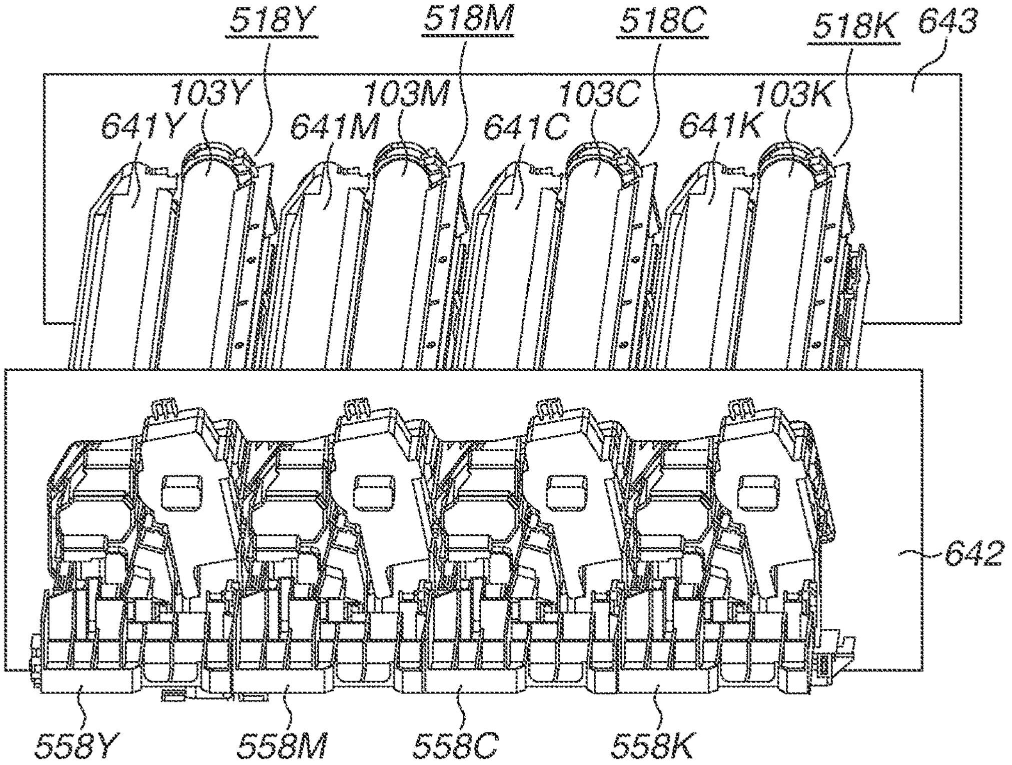
FIGS. 2A and 2B are perspective views each illustrating a structure in the vicinity of drum units and developing units.
Figure 2B:
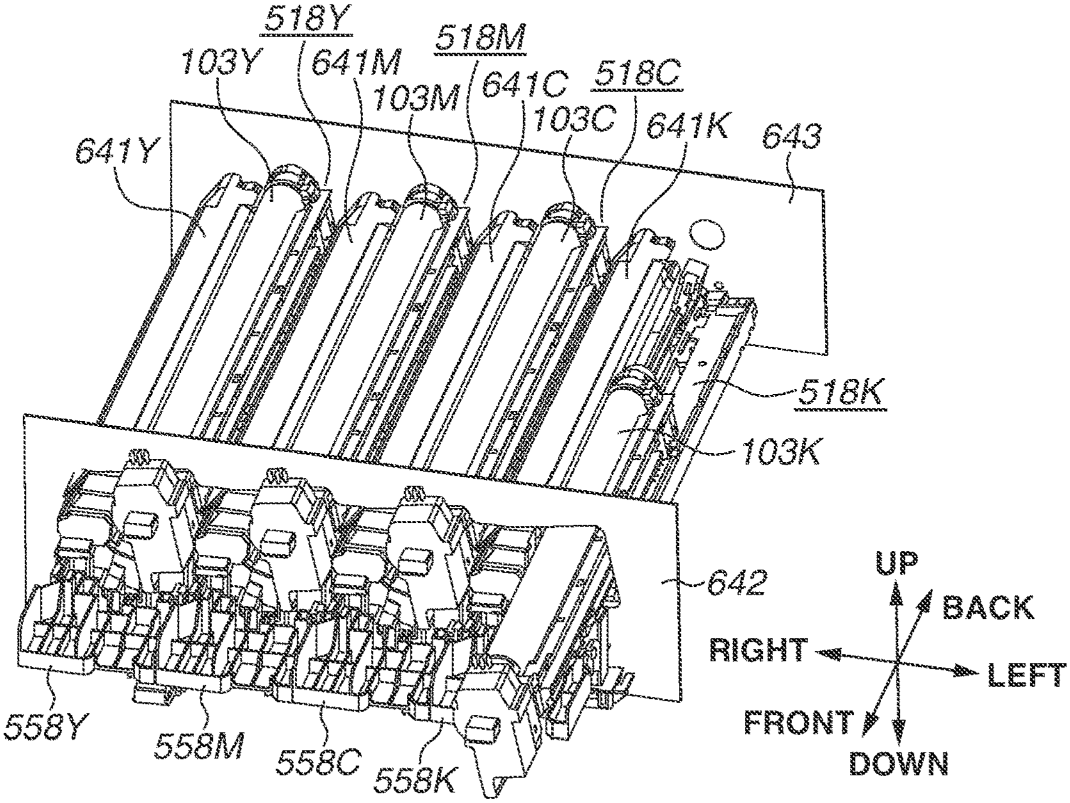

FIG. 2A is a perspective view schematically illustrating a structure in the vicinity of the drum units 518 (518Y, 518M, 518C, and 518K) and the developing units 641 (641Y, 641M, 641C, and 641K) included in the image forming apparatus 1. FIG. 2B illustrates a state where the drum units 518 are inserted into the image forming apparatus 1 from the outside of the apparatus body.

As illustrated in FIG. 2A, the image forming apparatus 1 includes a front side plate 642 that is formed of a metal sheet, and a back side plate 643 that is also formed of a metal sheet. The front side plate 642 is a side wall provided on the front side of the image forming apparatus 1. The front side plate 642 constitutes part of a housing of the apparatus body on the front side of the apparatus body of the image forming apparatus 1. The back side plate 643 is a side wall provided on the back side of the image forming apparatus 1. The back side plate 643 constitutes part of the housing of the apparatus body on the back side of the apparatus body of the image forming apparatus 1. As illustrated in FIG. 2A, the front side plate 642 and the back side plate 643 are arranged to be facing each other, and a metal sheet (not illustrated) serving as a beam is bridged over the front side plate 642 and the back side plate 643. The front side plate 642, the back side plate 643, and the beam (not illustrated) constitute part of a frame member of the image forming apparatus 1. The term front surface side or front side of the image forming apparatus 1 or the components thereof according to the present exemplary embodiment refers to a side where the drum unit 518 is inserted into or removed from the apparatus body.

The front side plate 642 is provided with an opening for inserting or removing the drum unit 518 and the developing unit 641 into or from the apparatus body on the front side of the image forming apparatus 1. The drum unit 518 and the developing unit 641 are each mounted at a predetermined position in the apparatus body of the image forming apparatus 1 through the opening. The image forming apparatus 1 also includes covers 558Y, 558M, 558C, and 558K (hereinafter also collectively referred to simply as a cover 558) that cover the front side of the respective drum units 518 and the respective developing units 641. One end of the cover 558 is fixed to the apparatus body of the image forming apparatus 1 with a hinge. The hinge enables the cover 558 to pivot relative to the apparatus body of the image forming apparatus 1. The operator opens the cover 558, takes out the drum unit 518 or the developing unit 641 from the apparatus body, and then inserts a new drum unit 518 or a new developing unit 641 and closes the cover 558, to thereby complete a replacement operation.

As illustrated in FIGS. 2A and 2B, a side where the front side plate 642 is located is hereinafter defined as the front side (or the front surface side) of the apparatus body, and a side where the back side plate 643 is located is hereinafter defined as the back side (or the back surface side) of the apparatus body. With respect to the photosensitive drum 103K on which the electrostatic latent image for the black toner image is formed, a side where the photosensitive drum 103Y on which the electrostatic latent image for the yellow toner image is formed is disposed is defined as the right side. With respect to the photosensitive drum 103Y on which the electrostatic latent image for the yellow toner image is formed, a side where the photosensitive drum 103K on which the electrostatic latent image for the black toner image is formed is disposed is defined as the left side. A direction that is perpendicular to the front-back direction and left-right direction defined herein and that is a vertically upward direction is defined as an up direction, and a direction that is perpendicular to the front-back direction and left-right direction defined herein and that is a vertically downward direction is defined as a down direction. The front direction, the back direction, the right direction, the left direction, the up direction, and the down direction, which are defined above, are illustrated in FIG. 2B. The term rotational axis direction of the photosensitive drum 103 used herein refers to a direction that coincides with the front-back direction illustrated in FIG. 2B. The term longitudinal direction of an optical printhead 105 also refers to the direction that coincides with the front-back direction illustrated in FIG. 2B. In other words, the rotational axis direction of the photosensitive drum 103 and the longitudinal direction of the optical printhead 105 coincide with each other.

(Exposure Unit)

Next, the exposure unit 520 including the optical printhead 105 will be described. The optical printhead 105 has a longitudinal shape extending in the rotational axis direction of the photosensitive drum 103. The optical printhead 105 includes a holding member 505, a lens array 506, and a substrate 502. The lens array 506 and the substrate 502 are held by the holding member 505. In the present exemplary embodiment, the holding member 505 is a member that is made of metal and is formed by bending a plate material obtained by performing a plating process on a galvanized steel plate or cold-rolled steel plate. The use of a metal plate material makes it possible to achieve strength by performing a bending process, while reducing costs. However, the configuration of the holding member 505 is not limited to the configuration obtained by performing the bending process on the metal plate material. The holding member 505 can also be, for example, what is called a die-cast product. The die-cast product refers to a product manufactured by die-casting, i.e., cooling and solidifying molten metal injected into a mold (cavity). In a case where the die-casting is adopted as the manufacturing method, a product having a complex shape can be manufactured depending on a shape of the mold serving as a basis for the product's shape. Meanwhile, since fabrication of the mold is costly, there is a disadvantage in that there is no cost advantage when there is no need to manufacture a large amount of identical products. In the present exemplary embodiment, the holding member 505 may be manufactured by bending a metal sheet or may be manufactured by die-casting. The use of the holding member 505 which is made of metal for the optical printhead 105 makes it possible to increase the strength of the optical printhead 105. The holding member 505 which is made of metal has higher thermal conductivity than that of a holding member made of resin. Accordingly, the possibility that the holding member 505 may be deformed can be reduced even when the temperature of each electronic component mounted on the substrate 502 increases and the temperature in the space near the substrate increases.

An example of the exposure method to be used for an electrophotographic image forming apparatus is a laser beam scanning exposure method. In this method, the surface of the photosensitive drum 103 is scanned with an irradiation beam which is emitted from a semiconductor laser, is reflected by a rotating polygon mirror or the like, and goes through an f-O lens or the like. The optical printhead 105 described in the present exemplary embodiment is used in an LED exposure method for exposing the surface of the photosensitive drum 103 using light-emitting elements such as LEDs arrayed in the rotational axis direction of the photosensitive drum 103, and is not used in the above-described laser beam scanning exposure method.

The exposure unit 520 described in the present exemplary embodiment is provided on the lower side in the vertical direction relative to the rotational axis of the photosensitive drum 103. The substrate (not illustrated) included in the holding member 505 is provided with LEDs as the light-emitting elements, and the light-emitting elements emit light to which the surface of the photosensitive drum 103 is exposed from below. However, the exposure unit 520 may be provided on the upper side in the vertical direction relative to the rotational axis of the photosensitive drum 103, and the surface of the photosensitive drum 103 may be exposed to light from above (see FIG. 1B).

Figure 3:
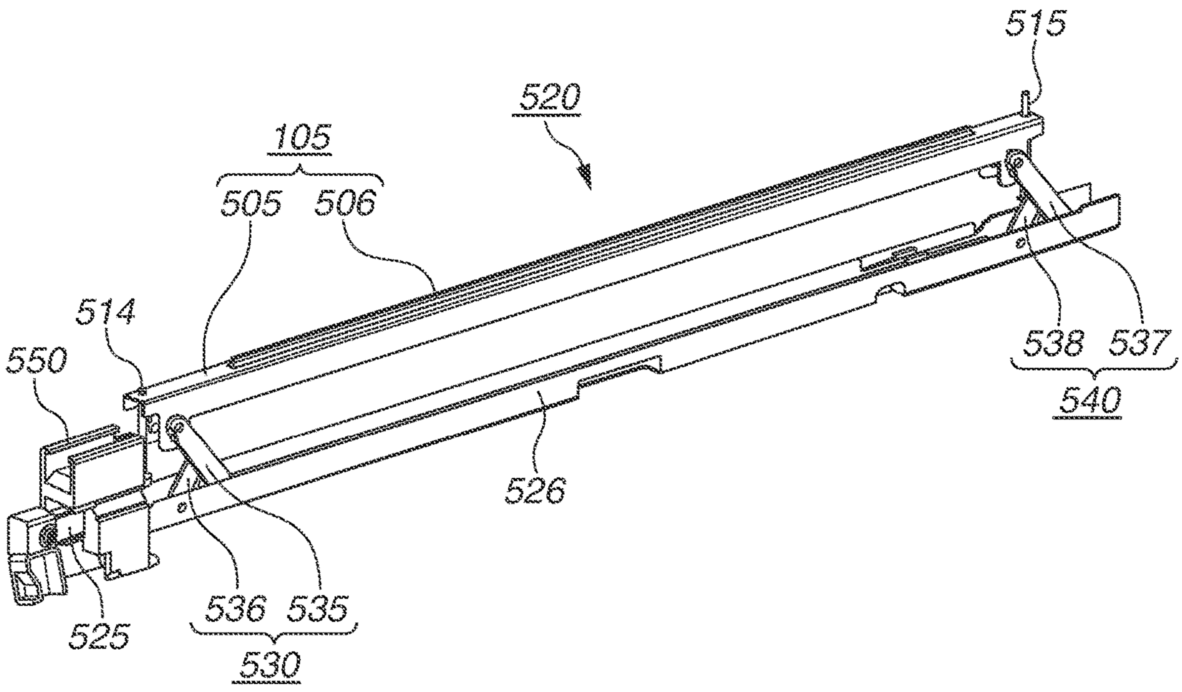
FIG. 3 is a schematic perspective view of an exposure unit.

FIG. 3 is a schematic perspective view of the exposure unit 520 included in the image forming apparatus 1 according to the present exemplary embodiment.

As illustrated in FIG. 3, the exposure unit 520 includes the optical printhead 105, a support member 526, a first link mechanism 530, and a second link mechanism 540. The holding member 505 is provided with a contact pin 514 and a contact pin 515. The contact pin 514 and the contact pin 515 are straight pins made of metal. For example, the contact pin 515 is provided on the holding member 505 on one side (back side) of the lens array 506 in the rotational axis direction of the photosensitive drum 103, and projects from both sides of the holding member 505 in an optical axis direction of the lens array 506. The contact pin 514 has a configuration similar to that of the contact pin 515. When the contact pin 514 and the contact pin 515 are brought into contact with the drum unit 518, a gap is formed between the photosensitive drum 103 and a light-emitting surface of the lens array 506. Thus, the position of the optical printhead 105 with respect to the photosensitive drum 103 is determined.

The contact pin 514 and the contact pin 515 are fixed to the holding member 505, which is made of metal, by welding. Thus, in the present exemplary embodiment, the contact pin 514 and the contact pin 515 are integrated with the holding member 505. The method for fixing the contact pin 514 and the contact pin 515 to the holding member 505 is not limited to welding, but instead may be fixation with an adhesive. The contact pin 514 and the contact pin 515 may be threaded and screwed into the holding member 505 to be fastened to the holding member 505.

The first link mechanism 530 includes a link member 535 and a link member 536. The second link mechanism 540 includes a link member 537 and a link member 538. As described in detail below, the link member 535 is attached to the back side relative to the center of the holding member 505 in the rotational axis direction of the photosensitive drum 103, and the link member 537 is attached to the front side relative to the center of the holding member 505 in the rotational axis direction of the photosensitive drum 103.

A slide member (slider) 525 to be described below slides in the front-back direction along with an opening and closing operation of the cover 558 provided on the front side of the image forming apparatus 1. The link members 535 to 538 rotate along with the slide movement of the slide member 525, thereby enabling the optical printhead 105 to move in the up-down direction.

In the present exemplary embodiment, the optical printhead 105 is provided on the lower side in the vertical direction relative to the photosensitive drum 103. Specifically, in the image forming apparatus 1 according to the present exemplary embodiment, the surface of the photosensitive drum 103 is exposed to light emitted by the optical printhead 105 from below in the vertical direction.

As illustrated in FIG. 3, the exposure unit 520 includes the support member 526. The support member 526 supports the optical printhead 105 via the first link mechanism 530 and the second link mechanism 540. Specifically, the link member 535 of the first link mechanism 530 supports the holding member 505, and the link member 537 of the second link mechanism 540 supports the holding member 505.

In this manner, the link member 535 and the link member 537 support the holding member 505 directly or indirectly. Since the link member 535 and the link member 537 are made of resin, the holding member 505 is not grounded, or is in an electrically floating state.

The support member 526 is formed by bending a metal sheet into a U-shape. The support member 526 is a longitudinal member extending in the rotational axis direction of the photosensitive drum 103. One end (front side) of the support member 526 in the longitudinal direction of the support member 526 is fixed to the front side plate 642, and the other end (back side) of the support member 526 in the longitudinal direction of the support member 526 is fixed to the back side plate 643. Thus, the position of the support member 526 is fixed with respect to the photosensitive drum 103 on the side opposite to the side where the photosensitive drum 103 is disposed with respect to the holding member 505 in the optical axis direction of the lens array 506. The support member 526 is grounded via one or both of the front side plate 642 and the back side plate 643.

The support member 526 includes the slide member 525 that is movable in the longitudinal direction of the support member 526. The link members 535 to 538 rotate along with the movement of the slide member 525 relative to the support member 526, thereby enabling the optical printhead 105 to move relative to the support member 526.

(Configurations of Substrate and Lens Array)

Figure 4A:
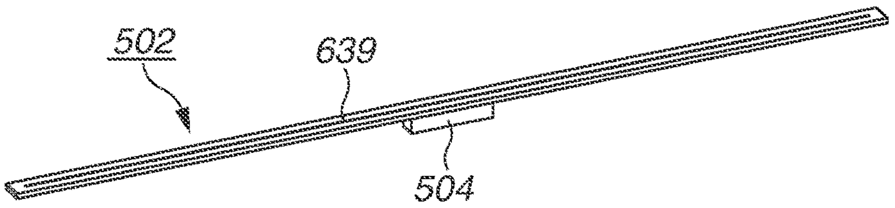
Figure 4A:
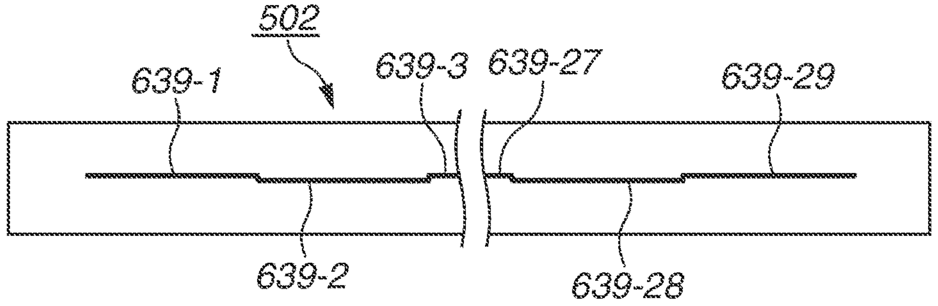
Figure 4A:
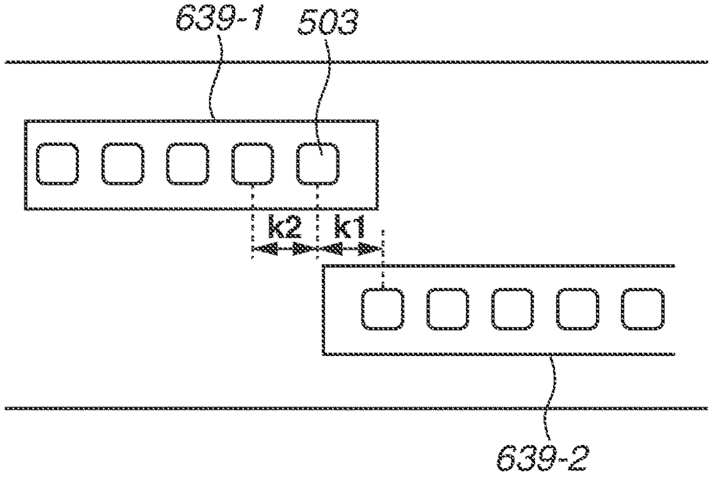
Figure 4A:
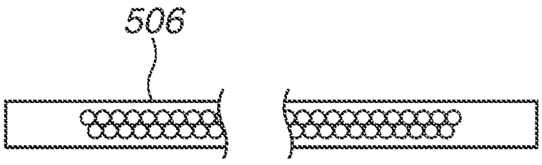
Figure 4A:
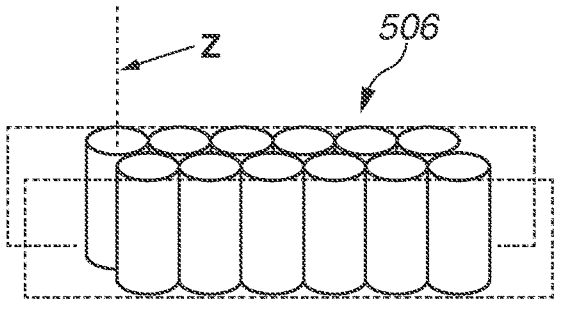

Next, the substrate 502 and the lens array 506 will be described with reference to FIGS. 4A, 4B1, 4B2, 4C1, and 4C2. First, the substrate 502 will be described. FIG. 4A is a schematic perspective view of the substrate 502. FIG. 4B1 illustrates an array of a plurality of LEDs 503 provided on the substrate 502, and FIG. 4B2 illustrates an enlarged view of FIG. 4B1.

LED chips 639 are mounted on the substrate 502. As illustrated in FIG. 4A, the LED chips 639 are provided on one surface of the substrate 502, and a connector 504 is provided on the back surface of the substrate 502. The substrate 502 is provided with a wiring pattern for supplying a signal to each of the LED chips 639. To the connector 504, one end of a flexible flat cable (FFC) (not illustrated) is connected. The main body of the image forming apparatus 1 is provided with a substrate that is different from the substrate 502. This substrate is provided with a central processing unit (CPU) for controlling a light-emitting timing of each of the LEDs 503. The other end of the FFC is connected to a connector mounted on the substrate provided on the image forming apparatus 1. The FFC transmits a drive signal for driving each of the LEDs 503 to the substrate 502 from the substrate provided on the image forming apparatus 1.

The LED chips 639 mounted on the substrate 502 will be described in more detail. As illustrated in FIGS. 4B1 and 4B2, a plurality of (29) LED chips 639-1 to 639-29 each including the plurality of LEDs 503 arranged thereon is arrayed on one surface of the substrate 502.

On each of the LED chips 639-1 to 639-29, 516 LEDs 503 (light-emitting elements) are arrayed in a row in the longitudinal direction of the LED chips 639. A center-to-center distance k2 between the adjacent LEDs 503 in the longitudinal direction of the LED chips 639 corresponds to the resolution of the image forming apparatus 1. The image forming apparatus 1 according to the present exemplary embodiment has a resolution of 1200 dpi. Accordingly, the array of the LEDs 503 is formed such that the center-to-center distance k2 between the adjacent LEDs 503 is 21.16 μm in the longitudinal direction of the LED chips 639-1 to 639-29. Therefore, the optical printhead 105 according to the present exemplary embodiment has an exposure range of about 316 mm. A photosensitive layer of the photosensitive drum 103 is formed to have a width greater than or equal to 316 mm. Since the length of a long side of an A4-size recording sheet and the length of a short side of an A3-size recording sheet are 297 mm, the optical printhead 105 according to the present exemplary embodiment has the exposure range capable of forming images on an A4-size recording sheet and an A3-size recording sheet.

The LED chips 639-1 to 639-29 are alternately arranged in two rows in the rotational axis direction of the photosensitive drum 103. Specifically, as illustrated in FIG. 4B1, the odd-numbered LED chips 639-1, 639-3, . . . , and 639-29 counted from the left side are mounted in one row in the longitudinal direction of the substrate 502. The even-numbered LED chips 639-2, 639-4, . . . , and 639-28 counted from the left side are mounted in one row in the longitudinal direction of the substrate 502. By arranging the LED chips 639 in this manner, as illustrated in FIG. 4B2, a center-to-center distance k1 between an LED 503 disposed on one end of one of the adjacent different LED chips 639 and an LED 503 disposed on the other end of the other of the adjacent different LED chips 639 can be made equal to the center-to-center distance k2 between the adjacent LEDs 503 on a single LED chip 639 in the longitudinal direction of the LED chip 639.

In the present exemplary embodiment, each light-emitting element is a semiconductor LED, but instead may be, for example, an organic light-emitting diode (OLED). The OLED is also referred to as an organic electro-luminescence (EL) and is a current-driven light-emitting element. For example, OLEDs are arranged on a line in a main scanning direction (rotational axis direction of the photosensitive drum 103) on a substrate of a thin film transistor (TFT) and are electrically connected in parallel by a power supply line that is also provided in the main scanning direction.

Next, the lens array 506 will be described. FIG. 4C1 is a schematic view of the lens array 506 as viewed from the photosensitive drum 103. FIG. 4C2 is a schematic perspective view of the lens array 506. The lens array 506 functions to collect light emitted from the LEDs 503 on the surface of the photosensitive drum 103. As illustrated in FIG. 4C1, a plurality of lenses of the lens array 506 is arranged in two rows in the array direction of the plurality of LEDs 503. The lenses are alternately arranged such that one of the lenses in one of the rows of lenses is disposed to contact both of adjacent lenses in the array direction of the other of the rows of lenses. Each of the lenses is a cylindrical rod lens made of glass. Each of the lenses includes an incidence surface on which light emitted from each of the LEDs 503 is incident, and an emitting surface from which light incident from the incidence surface is emitted. The material of each lens is not limited to glass, but instead may be plastic. The shape of each lens is not limited to a cylindrical shape, but instead may be, for example, a polygonal column such as a hexagonal column.

A dashed line Z illustrated in FIG. 4C2 indicates a lens optical axis. The above-described movement mechanism enables the optical printhead 105 to move in a direction that is substantially in the lens optical axis indicated by the dashed line Z. The term lens optical axis used herein refers to a line that connects a focal point of a certain lens selected from among the plurality of lenses constituting the lens array 506 and the center of the light-emitting surface of the lens. To be exact, the optical axis of each lens may slightly vary from lens to lens. Even if an angle formed between the optical axis of a certain lens and the optical axis of another lens is not 0 degrees, the angle may be only a small angle. When the term lens optical axis is used, such a slight difference is not taken into consideration, and it is assumed that the term lens optical axis indicates the optical axis of any one of the plurality of lenses constituting the lens array 506. In addition, it is assumed that the direction of the optical axis of one lens coincides with the direction of the optical axis of another lens.

Figure 5:
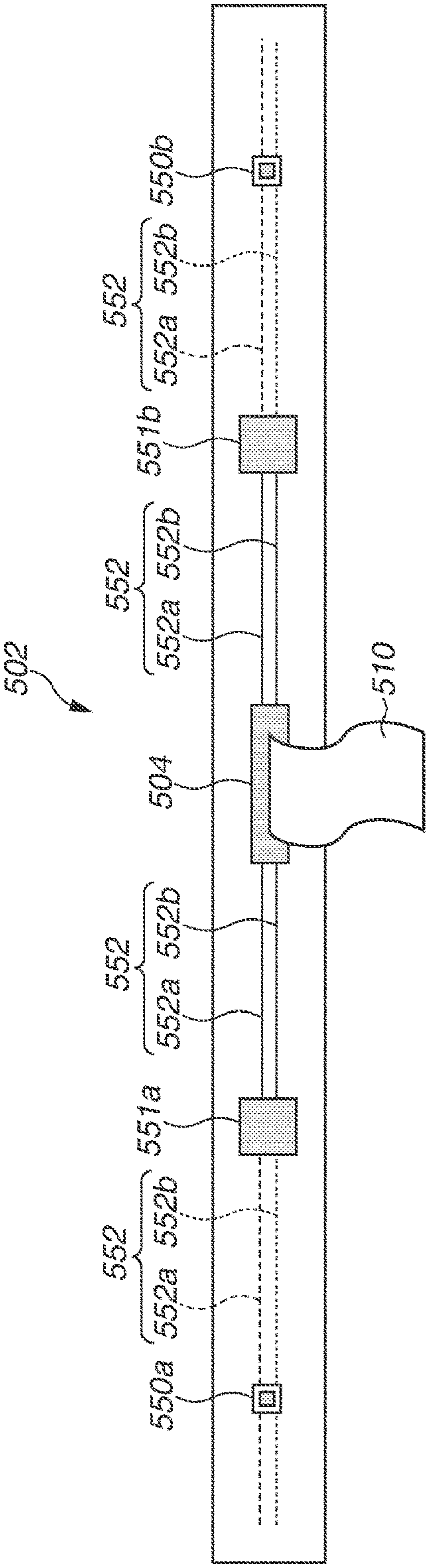
FIG. 5 illustrates a configuration of a back surface of the substrate.

Next, a wiring pattern 552 formed on the substrate 502 will be described. FIG. 5 illustrates the back surface of the substrate 502. The LED chips 639 including the LEDs 503 are mounted on the front surface of the substrate 502, and electronic components such as one or more driver integrated circuits (ICs) 551*a* and 551*b* for driving the LEDs 503 are mounted on the back surface of the substrate 502. In other words, the back surface of the substrate 502 refers to a surface of the substrate 502 that is opposite to the surface on which the light-emitting elements are mounted.

The term wiring pattern 552 used herein refers to a plurality of electric wires formed on the substrate 502. Typical examples of the electric wires include an electric wire 552*a* (power line) for driving the driver IC 551*a* (551*b*), and a ground wire 552*b* having a reference potential. The ground wire 552*b* also functions as an electric wire for grounding the driver ICs 551*a* and 551*b*. While the electric wire 552*a* is described as being a power line, the electric wire 552*a* may also be a signal line for transmitting a control signal to drive each of the LEDs 503.

The connector 504 is mounted in the vicinity of the center of the back surface of the substrate 502. An FFC 510 is attached to the connector 504. The FFC 510 is a cable formed of a plurality of electric wires.

Examples of the electric wires include an electric wire for transmitting a control signal (drive signal) to control the light-emitting timing of each of the LEDs 503, a supply line (also referred to as a power line) for supplying power, and a ground wire for grounding the wiring pattern 552.

The back surface of the substrate 502 is also provided with ground pads 550*a* and 550*b* each having the same potential as that of the ground wire 552*b*. A conductive member 701 to be described below contacts the ground pad 550*a* (550*b*) and the holding member 505, thereby electrically connecting the ground pad 550*a* (550*b*) and the holding member 505.

(Conductive Member)

Figure 6A:
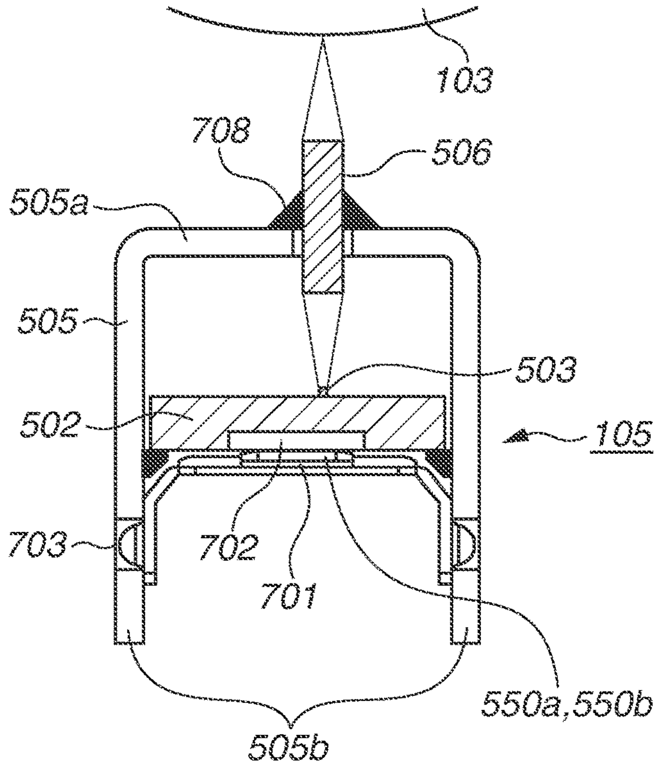
FIGS. 6A, 6B, and 6C each illustrate a conductive member.

FIG. 6A is a sectional view of the optical printhead 105 taken along a section perpendicular to the longitudinal direction of the optical printhead 105. As illustrated in FIG. 6A, the substrate 502 and the lens array 506 are held by the holding member 505 such that the substrate 502 and the lens array 506 face each other.

As seen from the sectional views of the image forming apparatus 1 illustrated in FIGS. 1A and 1B, the charger 104 is disposed in the vicinity of the optical printhead 105. A high voltage is applied to a charging roller included in the charger 104, and an intense electric field is formed in the vicinity of the charging roller. Accordingly, the optical printhead 105 is also located in the intense electric field, and thus the holding member 505 is gradually charged. In this case, if there is a difference between the potential of the holding member 505 and the potential of the wiring pattern 552 of the substrate 502, an electric current may be discharged from the holding member 505 and the wiring pattern 552. Even when the holding member 505 is grounded, the holding member 505 cannot be fully grounded in some cases due to a contact failure between components constituting a ground path. Thus, it is difficult to completely eliminate the difference between the potential of the holding member 505 and the potential of the wiring pattern 552 of the substrate 502. Therefore, it is desirable to provide a configuration for making the difference between the potential of the holding member 505 and the potential of the wiring pattern 552 of the substrate 502 as close to zero as possible.

In recent years, there has been a demand for a further increase in speed of the image forming apparatus 1. Along with the recent demand, there has been an increasing demand for the higher transmission accuracy of a signal for driving light-emitting elements. One of main factors for deterioration in signal transmission accuracy is noise emitted from the wiring pattern 552 of the substrate 502. The noise emitted from the wiring pattern 552 may have an effect on a signal transmitted through another part in the wiring pattern 552. To reduce the intensity of the noise emitted from the wiring pattern 552, it is desirable to fully ground the ground wire for the wiring pattern 552. In general, the ground wire for the wiring pattern 552 is grounded via the ground wire for the FFC 510. However, since the ground wire for the FFC 510 is extremely thin, it cannot be said that the ground wire for the wiring pattern 552 is fully grounded.

Accordingly, in the optical printhead 105 according to the present exemplary embodiment, the ground wire 552*b* for the wiring pattern 552 of the substrate 502 and the holding member 505 are electrically connected to thereby ground the wiring pattern 552 of the substrate 502.

As illustrated in FIG. 6A, the holding member 505 includes a fixed portion 505*a* that is provided with an opening 708 into which the lens array 506 is inserted, and a pair of wall portions 505*b* extending from both ends of the fixed portion 505*a* in a direction perpendicular to the rotational axis direction of the photosensitive drum 103. In the present exemplary embodiment, the holding member 505 is formed by bending a metal sheet. The holding member 505 is bent at both end portions of the fixed portion 505*a* so that the pair of wall portions 505*b* projects toward the side opposite to the side where the photosensitive drum 103 is disposed.

In this case, the pair of wall portions 505*b* is each provided with an opening 703. Protrusions formed on the conductive member 701 to be described below are fitted into respective openings 703. The conductive member 701 is a conductive component and electrically connects the holding member 505 with the ground wire 552*b* for the wiring pattern 552 formed on the substrate 502. The configuration makes the potential of the holding member 505 equal to the potential of the ground wire 552*b* for the wiring pattern 552.

Figure 6B:
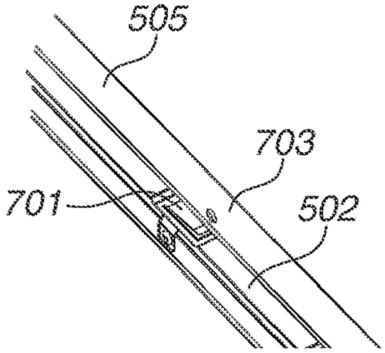
Figure 6C:
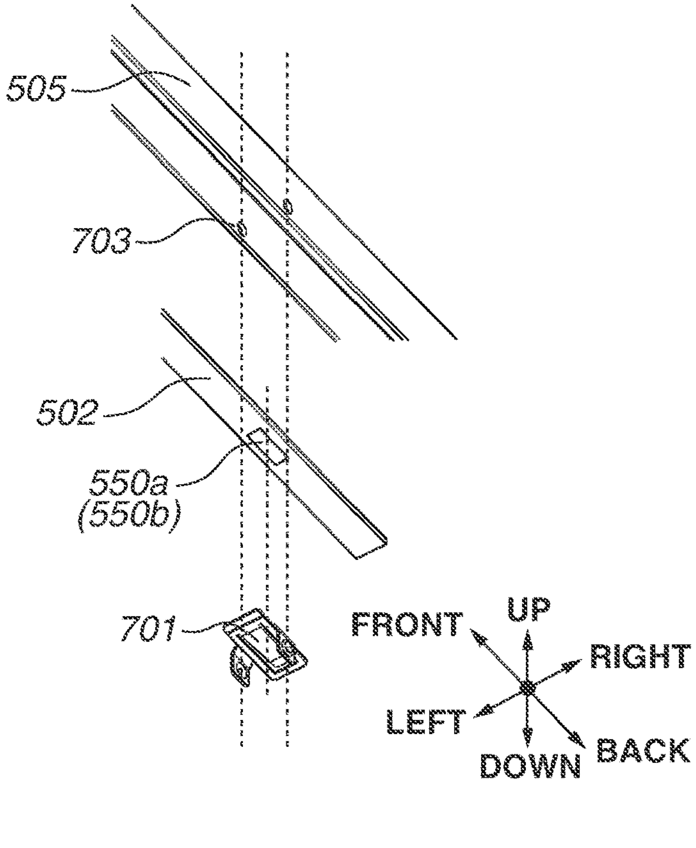

FIG. 6B is a bottom view of the holding member 505, and FIG. 6C is a view illustrating a method for attaching the conductive member 701 to the holding member 505.

As seen from FIG. 6B, the conductive member 701 is a metal component formed in a U-shape, and plate-like portions corresponding to both leg portions of the conductive member 701 are elastically deformable. As illustrated in FIG. 6C, when the conductive member 701 is inserted from below the holding member 505, the portions corresponding to the both leg portions of the conductive member 701 are fitted to the holding member 505 while being deformed inside.

(Movement Mechanism)

Figure 7A:
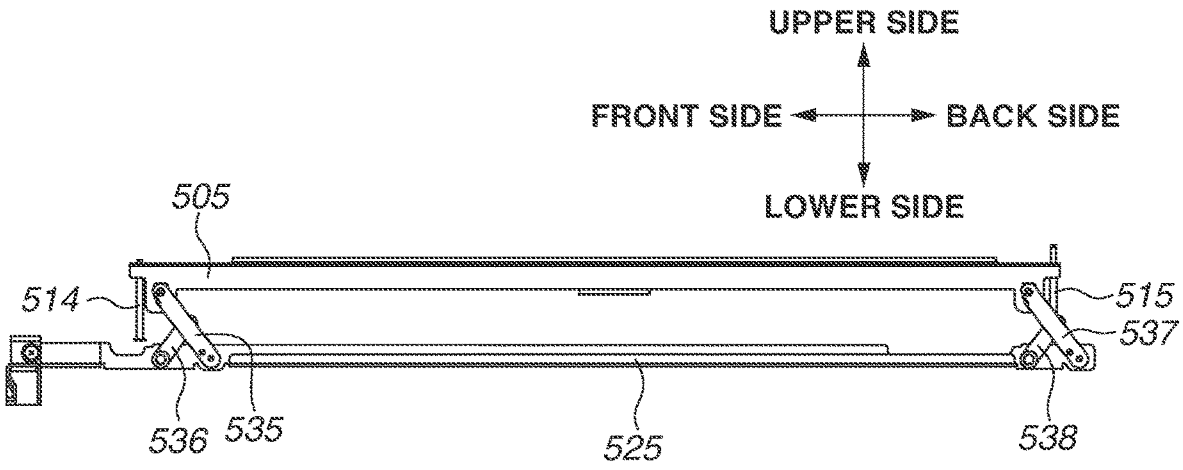
FIGS. 7A and 7B each illustrate a movement mechanism.
Figure 7B:
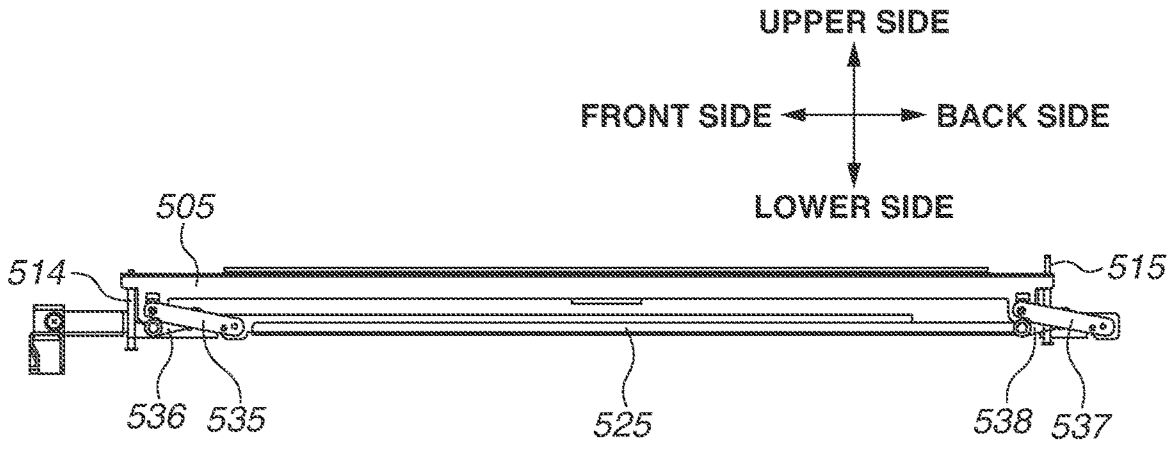

Next, a mechanism that enables the optical printhead 105 to move along with the slide movement of the slide member 525 will be described with reference to FIGS. 7A and 7B. FIGS. 7A and 7B illustrate the exposure unit 520 as viewed from the left side. For ease of description, the support member 526 is not illustrated. FIG. 7A illustrates a state where the optical printhead 105 is located at an exposure position (first position) corresponding to a position where the photosensitive drum 103 is exposed to light. FIG. 7B illustrates a state where the optical printhead 105 is located at a retracted position (second position) farther from the photosensitive drum 103 than the exposure position. In the present exemplary embodiment, a distance between the photosensitive drum 103 and the light-emitting surface of the lens array 506 when the optical printhead 105 is located at the exposure position is about 3 mm.

As illustrated in FIGS. 7A and 7B, the link member 535 is rotatably connected to one end of the slide member 525 in the longitudinal direction of the slide member 525, and the link member 537 is rotatably connected to the other end of the slide member 525 in the longitudinal direction of the slide member 525.

The slide member 525 slides to the back side from the front side when the cover 558 (not illustrated) is rotated to an open state from a closed state. When the slide member 525 slides from the front side to the back side, the link member 535 and the link member 537 rotate counterclockwise in FIGS. 7A and 7B. The link member 535 and the link member 536 are rotatably connected to each other. The link member 537 and the link member 538 are also rotatably connected to each other.

One end of the link member 536 is rotatably connected to the support member 526 (not illustrated). Accordingly, the link member 536 also rotates about the support member 526 along with the rotation of the link member 535. One end of the link member 538 is rotatably connected to the support member 526 (not illustrated). Accordingly, the link member 538 also rotates about the support member 526 along with the rotation of the link member 537. When the slide member 525 moves to the back side from the front side, the link member 536 and the link member 538 rotate clockwise about the support member 526. In this case, the other end of the link member 535 is rotatably connected to the holding member 505, and the other end of the link member 537 is rotatably connected to the holding member 505.

Accordingly, the link member 535 and the link member 537 rotate counterclockwise when the slide member 525 slide to the back side from the front side, so that the other end of the link member 535 and the other end of the link member 537 move in a direction away from the photosensitive drum 103. Thus, the optical printhead 105 moves to the retracted position from the exposure position.

Next, a procedure where the optical printhead 105 moves from the state illustrated in FIG. 7B to the state illustrated in FIG. 7A, i.e., from the retracted position to the exposure position, along with the slide movement of the slide member 525 will be described.

The slide member 525 moves to the front side from the back side along with the rotation of the cover 558 (not illustrated) to the closed state from the open state. When the slide member 525 slides to the front side from the back side, the link member 535 and the link member 537 rotate clockwise in FIGS. 7A and 7B. At the same time, the link member 536 and the link member 538 rotate counterclockwise. When the link member 535 and the link member 537 rotate clockwise along with the slide movement of the slide member 525 from the back side to the front side, the other end of the link member 535 and the other end of the link member 537 move in a direction approaching the photosensitive drum 103. Thus, the optical printhead 105 moves to the exposure position from the retracted position. In the present exemplary embodiment, the movement direction of the optical printhead 105 that moves to the retracted position and to the exposure position substantially coincides with the optical axis direction of the lens array 506.

When the holding member 505 of the optical printhead 105 gradually moves to the exposure position from the retracted position along with the slide movement of the slide member 525, the contact pin 514 provided at one end of the holding member 505 in the longitudinal direction of the holding member 505 and the contact pin 515 provided at the other end of the holding member 505 contact the drum unit 518. In other words, when the optical printhead 105 is located at the exposure position, the contact pin 514 and the contact pin 515 contact the frame of the drum unit 518. The term frame used herein refers to a part of the frame member of the drum unit 518. In the manner as described above, the position of the holding member 505 with respect to the drum unit 518, i.e., the position of the optical printhead 105, is determined.

When the position of the holding member 505 with respect to the drum unit 518 is determined as described above, the distance between the light-emitting surface of the lens array 506 and the photosensitive drum 103 is also determined, and thus the movement of the optical printhead 105 to the exposure position is completed.

Figure 8A:
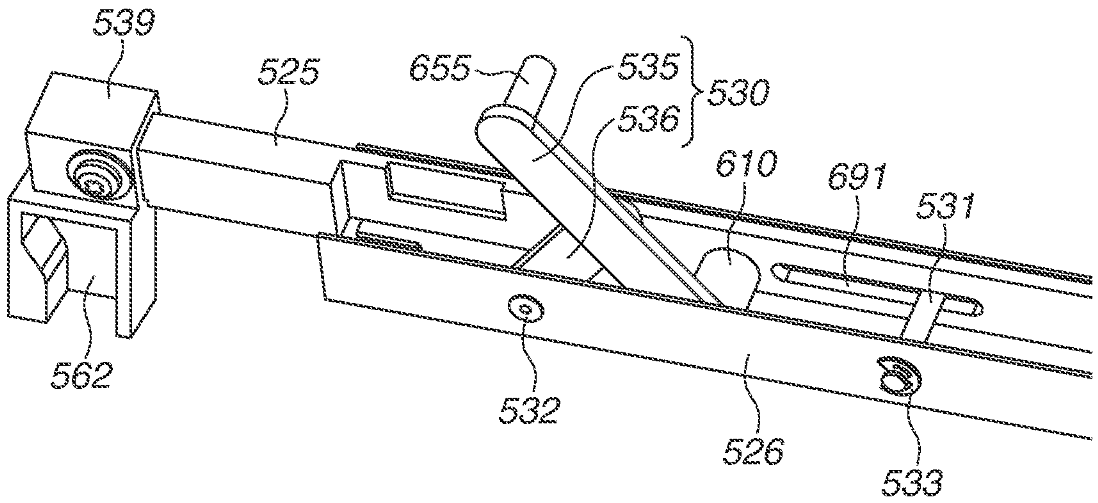
FIGS. 8A and 8B each illustrate a link mechanism.
Figure 8B:
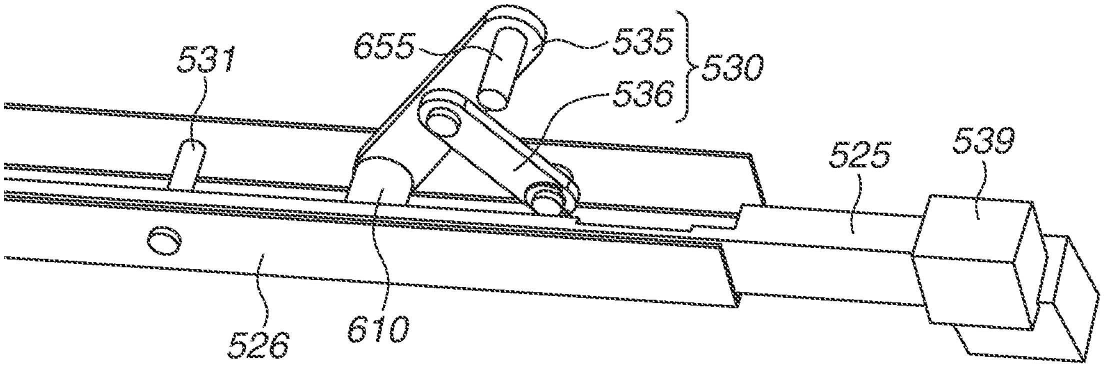

The configurations of the first link mechanism 530 and the second link mechanism 540 will be described in more detail with reference to FIGS. 8A and 8B and FIGS. 9A and 9B. FIG. 8A is a schematic perspective view of the front side of the support member 526 as viewed from the left side. FIG. 8B is a schematic perspective view of the front side of the support member 526 as viewed from the right side. The first link mechanism 530 provided on the front side of the support member 526 will be described below. The configuration of the second link mechanism 540 is substantially the same as the configuration of the first link mechanism 530, and thus the description thereof is omitted.

As illustrated in FIGS. 8A and 8B, the support member 526 includes a support shaft 531 and an E-shaped retaining ring 533. A right side wall surface and a left side wall surface of the support member 526 processed into a U-shape are respectively provided with holes into which the support shaft 531 is inserted. In a state where the support shaft 531 is inserted into the holes, the support shaft 531 is fixed to the support member 526 with the E-shaped retaining ring 533.

The slide member 525 is a plate-shaped member made of metal. As illustrated in FIG. 8A, the slide member 525 is provided with a long hole 691 extending in the front-back direction. The support shaft 531 is inserted into the long hole 691. In the present exemplary embodiment, the support shaft 531 is loosely fitted into the long hole 691 with a gap of about 0.1 to 0.5 mm in the vertical direction. The diameter of the long hole 691 in the longitudinal direction is about 350 mm. The configuration enables the slide member 525 to slide in the front-back direction by about 350 mm with respect to the support member 526.

An assist member 539 is attached to one end of the slide member 525 (front side of the slide member 525) in the longitudinal direction of the slide member 525. The assist member 539 is provided with an accommodation space 562. The accommodation space 562 accommodates a protrusion formed on the cover 558. When the cover 558 rotates, the protrusion that moves with the rotating cover 558 is brought into contact with a side wall on the front side or a side wall on the back side of the accommodation space 562. The protrusion pushes the side wall on the front side of the accommodation space 562, thereby enabling the slide member 525 to move to the front side. In contrast, the protrusion pushes the side wall on the back side of the accommodation space 562, thereby enabling the slide member 525 to move to the back side. With this configuration, the slide member 525 moves in the front-back direction along with the rotation of the cover 558.

The first link mechanism 530 includes the link member 535 and the link member 536. The link member 535 and the link member 536 are longitudinal resin plate materials. In the longitudinal direction of the link member 535, a protrusion 655 is formed at one end (upper side in FIG. 8A) of the link member 535. In contrast, in the longitudinal direction of the link member 535, a tube portion 610 is formed at the other end (lower side in FIG. 8A) of the link member 535. The protrusion 655 is fitted into an opening formed on the front side of the holding member 505. This configuration enables the link member 536 to rotate about the protrusion 655 with respect to the holding member 505. The tube portion 610 is a hollow cylinder. As illustrated in FIGS. 8A and 8B, a protrusion projecting from the slide member 525 is fitted into the tube portion 610. This configuration enables the link member 536 to rotate also with respect to the slide member 525.

One end (upper side in FIG. 8B) of the link member 536 in the longitudinal direction is rotatably attached to the link member 535. In other words, the link member 535 and the link member 536 are rotatably connected to each other. In contrast, the other end (lower side in FIG. 8B) of the link member 536 in the longitudinal direction of the link member 536 is rotatably attached to the support member 526. Specifically, a lower side wall surface of the link member 536 and a left side wall surface of the support member 526 are provided with holes, respectively, and an insertion pin 532 is inserted into the holes. With this configuration, the link member 536 is rotatably fixed to the support member 526.

Figure 9A:
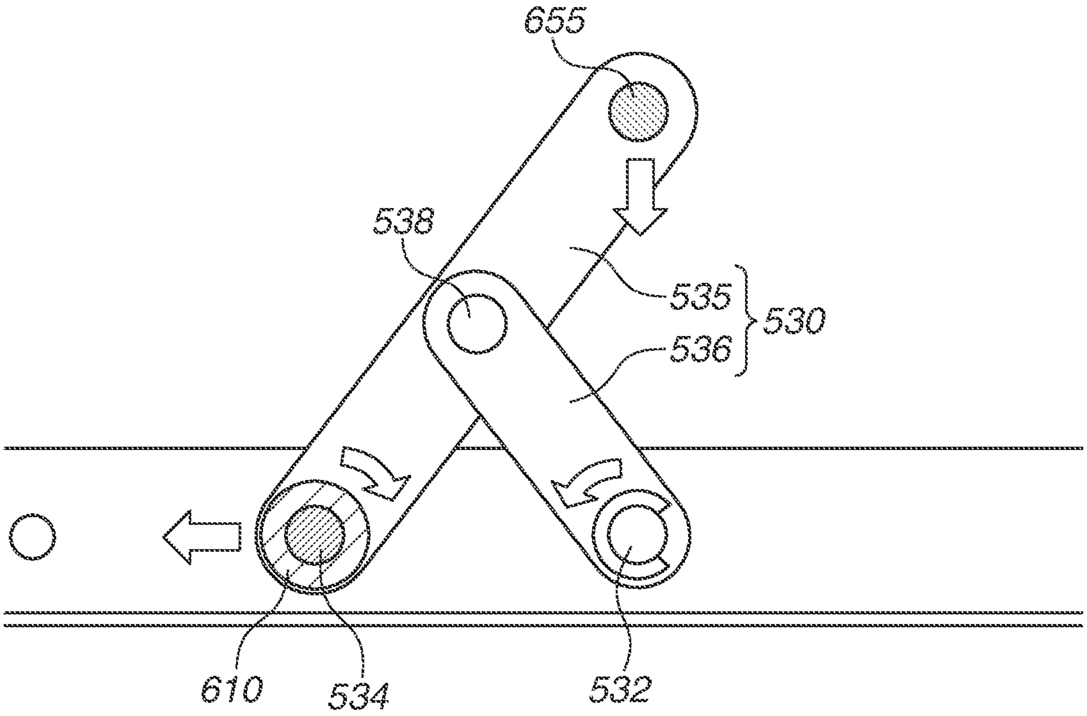
FIGS. 9A and 9B each illustrate a mechanism for rotating a first link member and a second link member.
Figure 9B:
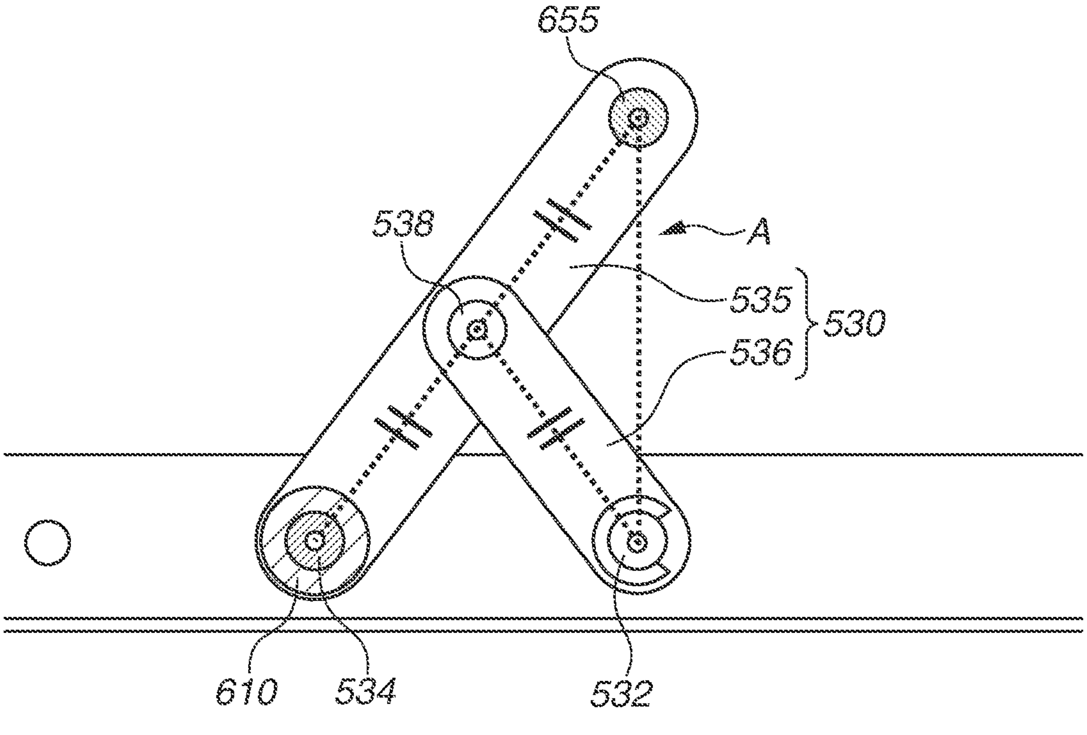

FIGS. 9A and 9B each illustrate a state where the link member 535 and the link member 536 included in the first link mechanism 530 rotate. As described above, the tube portion 610 formed on the link member 535 is fitted to a protrusion 534 formed on the support member 526. Accordingly, when the slide member 525 slides from the front side to the back side, the link member 535 rotates about the protrusion 534 clockwise in FIGS. 9A and 9B. Since the link member 535 and the link member 536 are rotatably connected to each other, the link member 536 rotates counterclockwise with respect to the slide member 525 along with the clockwise rotation of the link member 535. In this case, the link member 536 rotates about the insertion pin 532 with respect to the support member 526. When the link member 535 rotates while being rotatably supported by the link member 536, the protrusion 655 of the link member 535 moves to the lower side.

Herein, where L1 is a distance between the rotational center axis of the link member 535 with respect to the slide member 525 and the center axis of connection between the link member 535 and the link member 536, L2 is a distance between the rotational center axis of the link member 536 with respect to the support member 526 and the center axis of connection between the link member 535 and the link member 536, and L3 is a distance between the rotational center axis of the link member 535 with respect to the holding member 505 and the center axis of connection between the link member 535 and the link member 536, the distances L1, L2, and L3 are equal to each other. In general, such a link mechanism is referred to as a Scott-Russell mechanism. When the distances L1 to L3 are equal to each other, the movement direction of the protrusion 655 along with the slide movement of the slide member 525 coincides with the vertical direction. Specifically, the protrusion 655 moves along a dashed line A illustrated in FIG. 9B. This configuration enables the holding member 505 to move in the vertical direction along with the slide movement of the slide member 525.

(Grounding Mechanism)

As described above, since the holding member 505 is made of metal, the holding member 505 can be charged due to the effect of an electric field formed by the charger 104. Since the holding member 505 is a longitudinal member, the holding member 505 behaves like an antenna when the holding member 505 acquires an electric charge. When the holding member 505 behaves like an antenna, noise may be superimposed on a signal to be transmitted through the wiring pattern 552 of the substrate 502, which may cause a defective image. For this reason, it is desirable to ground the holding member 505.

Figure 10:
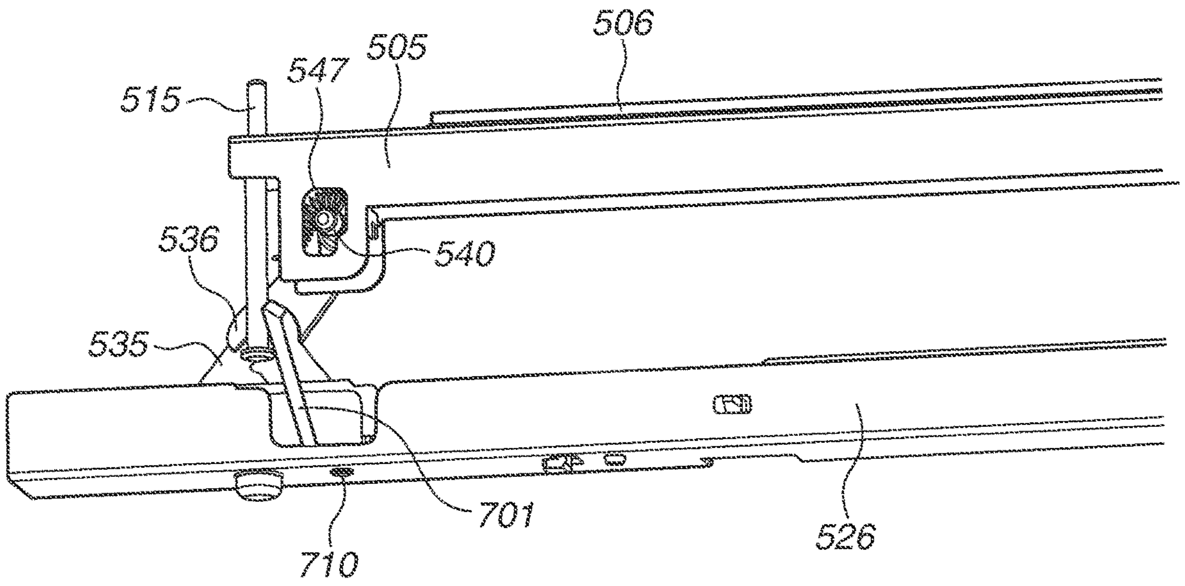
FIG. 10 is a perspective view illustrating a grounding mechanism.

FIG. 10 is a diagram illustrating a grounding mechanism according to the present exemplary embodiment. The support member 526 made of metal is supported by the front side plate 642 provided on the front side of the image forming apparatus 1 and by the back side plate 643 provided on the back side of the image forming apparatus 1. Accordingly, the support member 526 is grounded through one or both of the front side plate 642 and the back side plate 643.

A plate spring 711 that is made of metal is attached to the back side of the support member 526 with a screw 710. As illustrated in FIG. 10, a leading end of the plate spring 711 contacts the contact pin 515. The plate spring 711 is elastically deformed. The contact pin 515 is pressed in the rotational axis direction of the photosensitive drum 103 by a restoring force of the plate spring 711. Specifically, the plate spring 711 presses the contact pin 515 in a direction from the front side to the back side of the image forming apparatus 1. Since the plate spring 711 is constantly pressed against the contact pin 515 by an elastic force, the holding member 505 can be reliably grounded via the contact pin 515. In the present exemplary embodiment, the plate spring 711 is used as a member via which the holding member 505 is grounded, but instead a wire spring or the like can be used as such a member. Instead of using a plate spring or a wire spring, the contact pin 515 and the support member 526 may be directly connected with a conductor wire to obtain an effect that the holding member 505 is grounded. However, since the optical printhead 105 according to the present exemplary embodiment moves to the exposure position and to the retracted position, if the contact pin 515 and the support member 526 are connected with a conductor wire, the conductor wire can be deformed when the optical printhead 105 is located at the retracted position. If the deformed conductor wire is caught on, for example, the link member 535 (536), the conductor wire can be damaged. Accordingly, it may be desirable to separately perform a process for routing the conductor wire. Therefore, it is desirable to use the plate spring 711, as in the present exemplary embodiment, to obtain the effect that the holding member 505 is grounded.

Figure 11A:
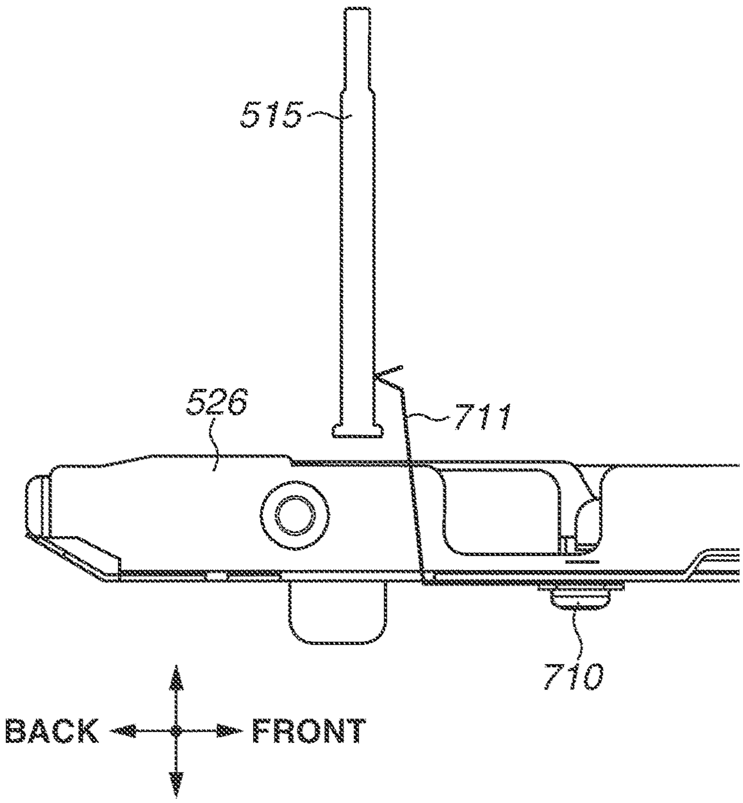
FIGS. 11A and 11B each illustrate a plate spring for grounding a holding member via a pin.
Figure 11B:
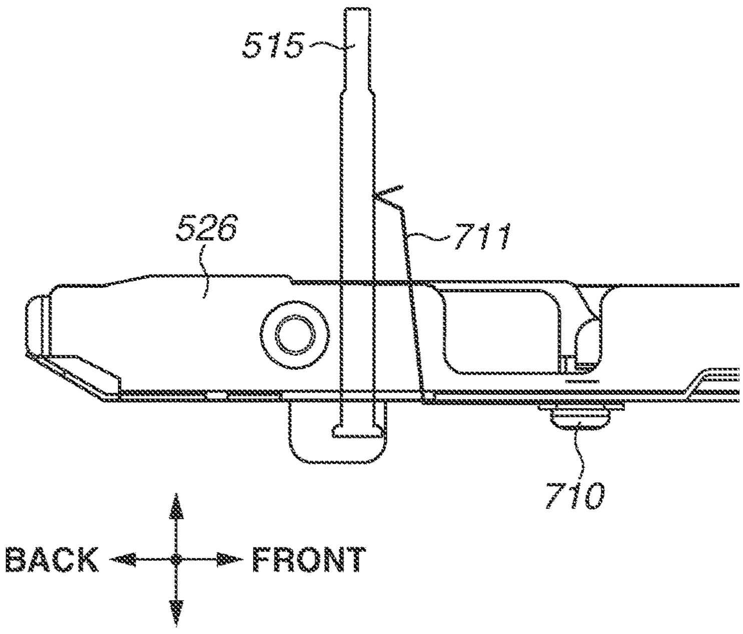

FIG. 11A illustrates a positional relationship between the contact pin 515 and the plate spring 711 when the holding member 505 is located at the exposure position. FIG. 11B illustrates a positional relationship between the contact pin 515 and the plate spring 711 when the holding member 505 is located at the retracted position. To simplify the illustration in FIGS. 11A and 11B, the holding member 505 is not illustrated. As seen from FIGS. 11A and 11B, even when the contact pin 515 moves together with the holding member 505 that moves to the exposure position and to the retracted position, the plate spring 711 is constantly in contact with the contact pin 515. In other words, the contact pin 515 moves together with the holding member 505 while being in contact with the plate spring 711. Accordingly, the holding member 505 is constantly grounded via the contact pin 515.

The shape of the conductive member 701 and the portion where the conductive member 701 is attached according to another exemplary embodiment will be described.

Figure 12:
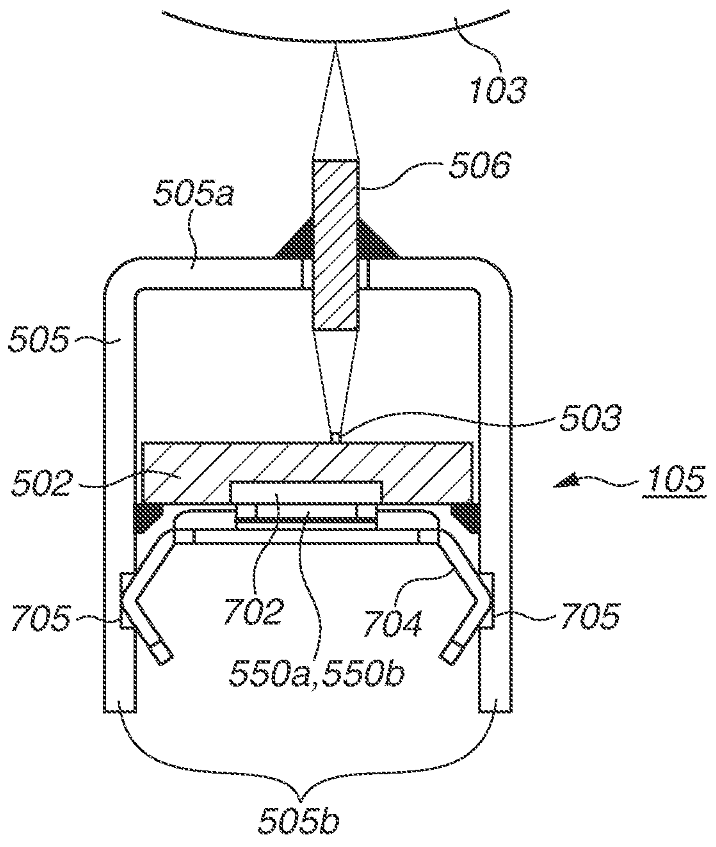
FIG. 12 is a view illustrating a conductive member according to another exemplary embodiment.

FIG. 12 illustrates an example where a conductive member 704 is used in place of the conductive member 701. As illustrated in FIG. 12, portions corresponding to both leg portions of the conductive member 704 are each bent at a middle portion thereof. Each of the pair of wall portions 505*b* of the holding member 505 is provided with a dent 705 in place of the opening 703. The bent portion of each of the portions corresponding to the both leg portions of the conductive member 704 is fitted into the dent 705. Thus, the conductive member 704 is fixed to the holding member 505.

Figure 13:
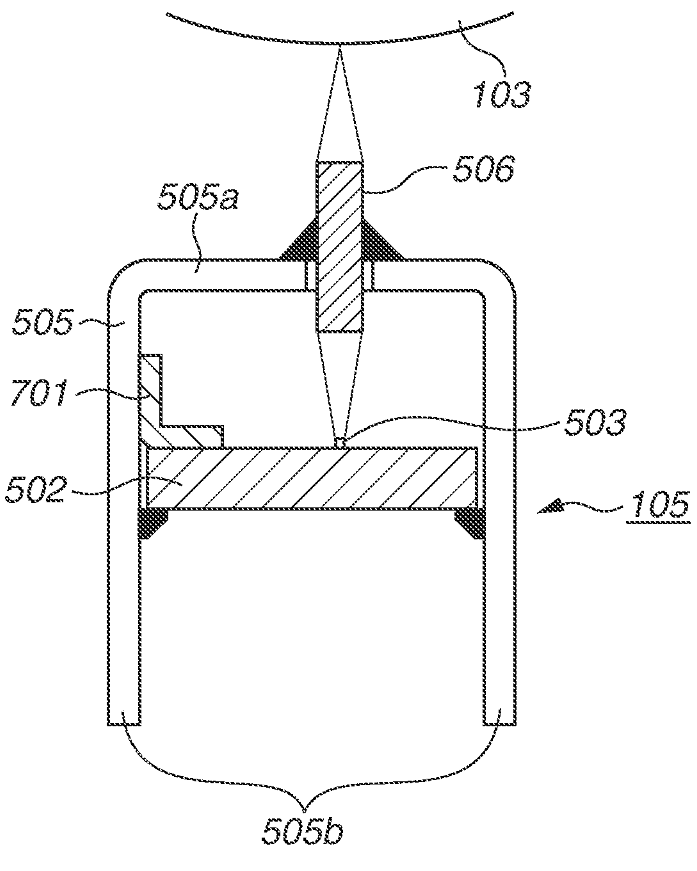
FIG. 13 is a view illustrating a conductive member according to still another exemplary embodiment.

FIG. 13 illustrates an example where the conductive member 701 is attached to the substrate 502 such that the conductive member 701 is brought into contact with the surface of the substrate 502. In this case, before the substrate 502 is attached to the holding member 505, the conductive member 701 is first fixed to the inside of the holding member 505 by bonding or the like. After that, the substrate 502 is inserted into the holding member 505 from below, and then the substrate 502 is fixed to the holding member 505 in a state where the substrate 502 is pressed against the conductive member 701. It is desirable to form the ground pads 550*a* and 550*b* of the substrate 502 on the surface of the substrate 502. The use of the configuration according to the present exemplary embodiment makes it possible to effectively use a space formed between the substrate 502 and the fixed portion 505*a* of the holding member 505. Consequently, the size of the optical printhead 105 in the vertical direction can be reduced.

As described above, according to the configuration of the present exemplary embodiment, the potential of the ground wire 552*b* for the wiring pattern 552 of the substrate 502 can be made equal to the potential of the holding member 505 with a simple configuration. Further, since the holding member 505 is grounded, the ground wire 552*b* for the wiring pattern 552 of the substrate 502 can be reliably grounded. Consequently, the intensity of noise emitted from the substrate 502 can be reduced.

The ground wire 552*b* for the wiring pattern 552 of the substrate 502 can be grounded with a simple configuration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

a photosensitive member that is rotatable;

a substrate including a plurality of light-emitting elements arrayed in a rotational axis direction of the photosensitive member and configured to emit light to which a surface of the photosensitive member is exposed, a driver integrated circuit (IC) configured to drive the plurality of light-emitting elements, and a pad electrically connected to the driver IC;

a lens array configured to collect the light emitted from the plurality of light-emitting elements on the photosensitive member;

a holder configured to hold the substrate and the lens array, wherein the holder is grounded and made of metal; and a conductive member including a first contact portion that contacts the pad and a second contact portion that contacts the holder and configured to electrically connect the holder and the pad.

2. The image forming apparatus according to claim 1, wherein the plurality of light-emitting elements is arranged on a first surface of the substrate, and wherein the pad is arranged on a second surface of the substrate on an opposite side to the first surface.

3. The image forming apparatus according to claim 1, wherein the substrate further includes a connector configured to connect the substrate with outside, and wherein the connector is arranged on the second surface.

4. The image forming apparatus according to claim 1, wherein the holder includes a holding member configured to hold the lens array and a wall portion extending from the holding member in a direction away from the photosensitive member, and wherein the second contact portion contacts the wall portion.

5. The image forming apparatus according to claim 4, wherein the conductive member contacts the holder, and wherein the conductive member further includes a third contact portion electrically connected to the holder.

6. The image forming apparatus according to claim 5, wherein the wall portion is a first wall portion, wherein the holder further includes a second wall portion extending from the holder in a direction away from the photosensitive member, wherein the second contact portion contacts the first wall portion, and wherein the third contact portion contacts the second wall portion.

7. The image forming apparatus according to claim 1, wherein the second contact portion contacts the holder in a state where the second contact portion is elastically deformed.

8. The image forming apparatus according to claim 1, wherein the conductive member is arranged in the holder.

9. The image forming apparatus according to claim 1, further comprising an exposure head including the substrate, the lens array, the holder, and the conductive member, wherein the exposure head is movable to an exposure position where the exposure head exposes the photosensitive member and a retracted position retracted from the exposure position.

10. The image forming apparatus according to claim 1, wherein the plurality of light-emitting elements is organic EL.

11. An exposure head comprising:

a substrate including a plurality of light-emitting elements arrayed in a longitudinal direction of the substrate and configured to emit light to which a surface of a photosensitive member is exposed, a driver integrated circuit (IC) configured to drive the plurality of light-emitting elements, and a pad electrically connected to the drive IC;

a lens array configured to collect the light emitted from the plurality of light-emitting elements on the photosensitive member;

a holder configured to hold the substrate and the lens array, wherein the holder is grounded and made of metal; and a conductive member including a first contact portion that contacts the pad and a second contact portion that contacts the holder and is configured to electrically connect the holder and the pad.

12. The exposure head according to claim 11, wherein the plurality of light-emitting elements is arranged on a first surface of the substrate, and wherein the pad is arranged on a second surface of the substrate on an opposite side to the first surface.

13. The exposure head according to claim 12, wherein the substrate further includes a connector configured to connect the substrate with outside, and wherein the connector is arranged on the second surface.

14. The exposure head according to claim 11, wherein the holder includes a holding member configured to hold the lens array and a wall portion extending from the holding member in a direction away from the photosensitive member, and wherein the second contact portion contacts the wall portion.

15. The exposure head according to claim 14, wherein the conductive member contacts the holder, and wherein the conductive member further includes a third contact portion electrically connected to the holder.

16. The exposure head according to claim 15, wherein the wall portion is a first wall portion, wherein the holder further includes a second wall portion extending from the holder in a direction away from the photosensitive member, wherein the second contact portion contacts the first wall portion, and wherein the third contact portion contacts the second wall portion.

17. The exposure head according to claim 11, wherein the second contact portion contacts the holder in a state where the second contact portion is elastically deformed.

18. The exposure head according to claim 11, wherein the conductive member is arranged in the holder.

19. The exposure head according to claim 11, wherein the exposure head is movable to an exposure position where the exposure head exposes the photosensitive member and a retracted position retracted from the exposure position.

20. The exposure head according to claim 11, wherein the plurality of light-emitting elements is organic EL.

* * * * *